UNITED STATES PATENT OFFICE.

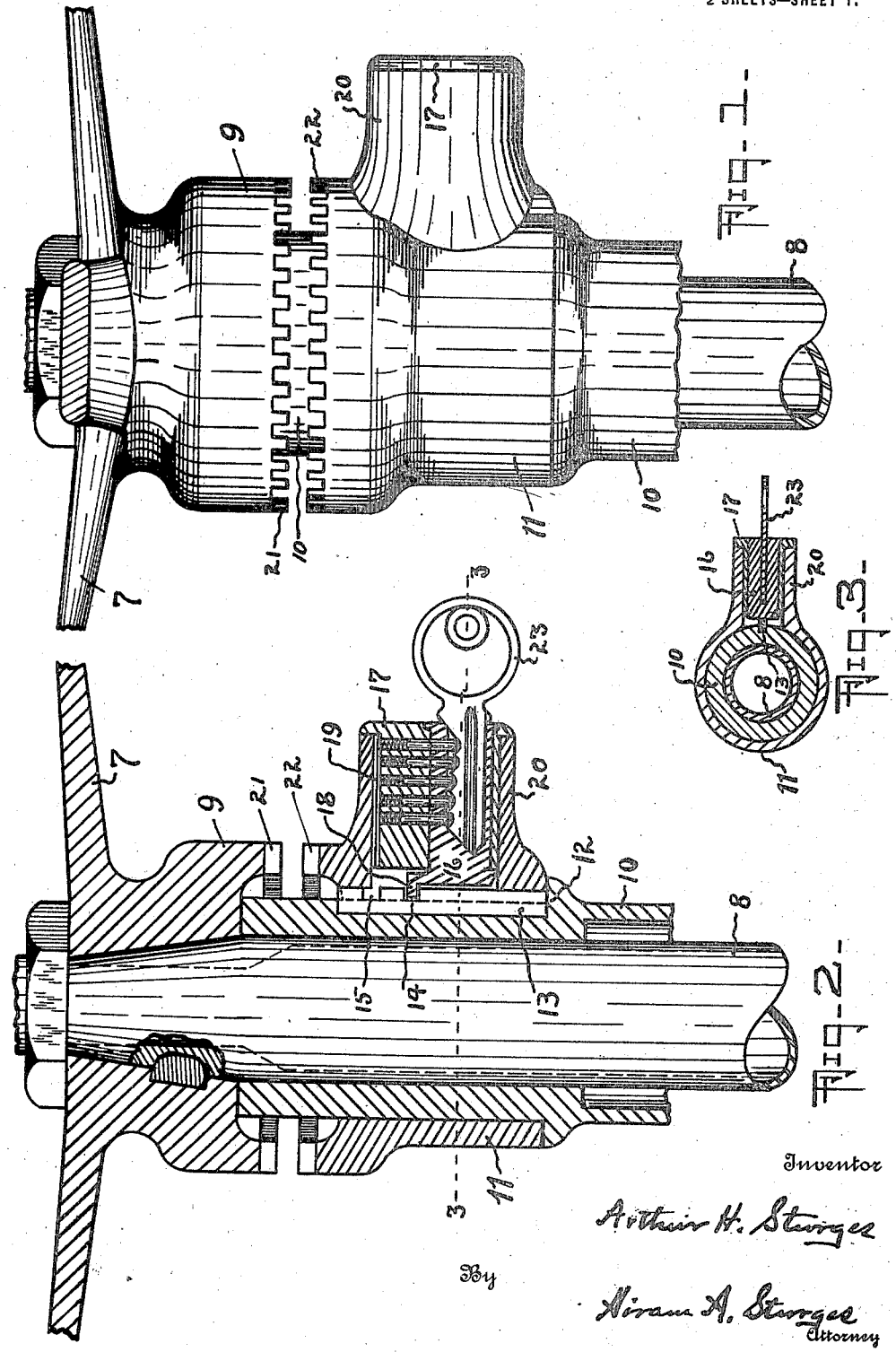
A. H. STURGES.
LOCKING MEANS FOR VEHICLE STEERING WHEELS.
APPLICATION FILED AUG. 29, 1916.
1,226,720.
Patented May 22, 1917.
2 SHEETS—SHEET 1.
Inventor
Arthur H. Sturges
By
Hiram A. Sturges
Attorney A. H. STURGES.
LOCKING MEANS FOR VEHICLE STEERING WHEELS.
APPLICATION FILED AUG. 29, 1916.
1,226,720.
Patented May 22, 1917.
2 SHEETS—SHEET 2.
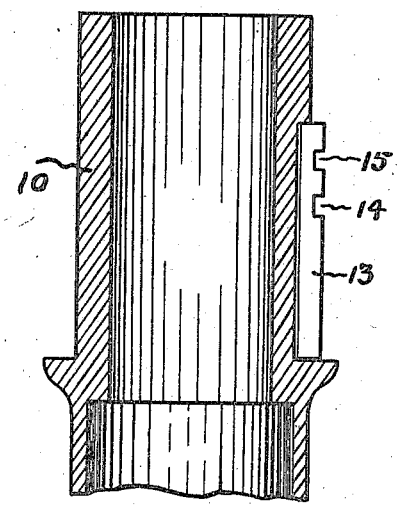
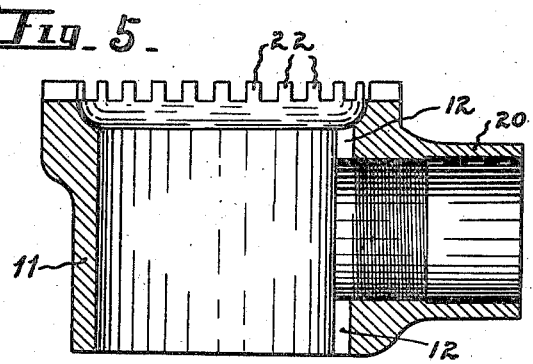
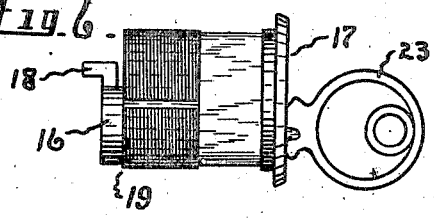
Inventor
Arthur H. Sturges,
By
Hiram A. Sturges
Attorney

ARTHUR H. STURGES, OF OMAHA, NEBRASKA.

LOCKING MEANS FOR VEHICLE STEERING-WHEELS.

1,226,720.  Specification of Letters Patent.  Patented May 22, 1917.

Application filed August 29, 1916. Serial No. 117,414.

*To all whom it may concern:*

Be it known that I, ARTHUR H. STURGES, a citizen of the United States, residing at Omaha, in the county of Douglas and State of Nebraska, have invented certain new and useful Improvements in Locking Means for Vehicle Steering-Wheels, of which the following is a specification.

This invention relates to locking means for vehicle steering wheels, and particularly for the steering wheels of automobiles, and broadly includes the combination with the normally rotatable steering shaft and wheel hub and the adjacent non-rotatable standard which provides the mounting for said shaft, of a movable part or keeper arranged, respectively, to engage or to be disengaged from the hub for preventing or permitting a rotatable movement of the wheel, the parts to be few and simple so that the device may be conveniently applied, and may be economically produced.

The invention consists of the novel construction, combination and arrangement of parts as described herein and claimed, and as illustrated in the accompanying drawing, wherein,—

Figure 1 is a view in side elevation showing the device mounted upon the non-rotatable standard, the steering wheel and steering shaft being broken away. Fig. 2 illustrates the parts shown in Fig. 1 showing a side view, partly broken, of the steering shaft, the other parts being in longitudinal section. Fig. 3 is a view in transverse section on a reduced scale, on line 3 3 of Fig. 2. Fig. 4 is a view of the standard in longitudinal section to clearly show the key employed. Fig. 5 is a view of the sleeve in longitudinal section to clearly show the slot for receiving the key of the standard. Fig. 6 is a side view of a lock.

In the drawing, which illustrates one embodiment of the invention, numeral 7 indicates a part of a steering wheel, its shaft and hub being indicated, respectively, at 8 and 9, these parts being normally movable for steering, while disposed in the non-rotatable, tubular standard 10.

In order that the rotatable movements mentioned for the steering wheel and its shaft may be under control, a keeper or sleeve 11 is provided; it is mounted upon and is adapted to have slidable movements longitudinally of the standard 10. At 12, best shown in Fig. 5, is indicated a slot or elongated key seat with which the sleeve 11 is provided, the standard 10 being provided with a key 13 having recesses 14 and 15 formed therein, adjacent to each other.

The rotatable barrel 16 of a conventional lock 17 is provided with an outwardly projecting lug or detent 18, the jacket 19 of the lock being mounted in the housing or collar 20 of the sleeve in a manner to prevent rotation. The lower end of the hub 9 is provided with teeth 21, and at 22 are indicated teeth with which the sleeve, at its upper end, is provided.

It will be understood that since the lug, arm or detent 18 swings in an arc substantially at right angles to the axis of the standard and its key 13, it may be moved outwardly from either of recesses 14 or 15, or may be moved within either of said recesses, as may be desired, a limited degree only of rotation of the barrel 16 being required for this purpose, the movement of said barrel being under control of its conventional member 23. The sleeve is non-rotatable with reference to the standard since it is splined thereon, but may move longitudinally thereof subject to the control of the detent 18.

In operation, to cause "locking" of the sleeve with the hub, the sleeve may be manually moved upwardly until its teeth engage the teeth of the hub, the barrel 16 being first rotated so that its lug 18 will move out of the recess 15. While the teeth are thus in engagement, the operator causes the barrel 16 to rotate in an opposite direction to that last mentioned so that the lug or detent will be disposed in the recess 14 which obviously operates to maintain the teeth 22 and 21 in engagement. The operator then withdraws member 23 from the barrel 16.

When an operator desires to use the vehicle, he may, by use of member 23, cause a rotatable movement of the barrel 16 for moving the lug or detent 18 out of the recess 14. The sleeve then may be moved manually longitudinally of the standard until its teeth are disengaged from the hub 9. The operator then, by use of member 23 causes a limited reverse rotation of the barrel 16 to cause the detent or lug 18 to enter recess 15 of the key 13, and it is obvious that the sleeve will be maintained in this lowered position with its teeth disengaged from the teeth of the hub, member 23 of course being withdrawn from the barrel 16, It will thus be seen that the construction provides means for maintaining the teeth 22 and 21 in engagement after the sleeve has been moved upwardly, means to permit a downward slidable movement of the sleeve for disengaging its teeth from the teeth of the hub, and means to prevent a slidable movement of the sleeve after its teeth have been disengaged from the teeth of the hub, this last function being fully as important as any, since it is obvious that the steering wheel should not become locked through inadvertence or from vibration of parts while the vehicle is moving.

While I have shown and described a sleeve 11, it will be understood that any latch member or keeper adapted to have a slidable movement upon and longitudinally of the standard or support 10 for engaging the hub 9 may be substituted for the sleeve if the same functions are performed, and I do not wish to be understood as limiting myself specifically to the use of a sleeve. Also, while it is preferred that the sleeve and hub be provided with teeth, said teeth may be dispensed with if the sleeve is in engagement with the hub when the detent 18 is disposed in the upper recess 15. Also changes in form, size, proportion and minor details may be made in construction as defined by the appended claims, without departing from the spirit of the invention or sacrificing any of its advantages.

What I claim and desire to secure by Letters Patent is,—

1. A locking means for the purpose described, comprising, in combination with the hub of a rotatable steering wheel, said hub being provided with teeth, a non-rotatable standard provided with a key and disposed in line with the hub, a sleeve mounted on the standard and provided with a key seat receiving the key of the standard, said sleeve being provided with teeth and adapted to be moved longitudinally of the standard for engaging its teeth with the teeth of the hub, and a detent member adapted to be moved in an arc substantially at right angles to the axis of the sleeve to engage the key of the standard for maintaining the teeth of said sleeve in engagement with the teeth of the hub.

2. A locking means for vehicle steering wheels, comprising, in combination with the hub of the rotatable steering wheel, said hub being provided with projections, a non-rotatable standard disposed in line with the axis of the hub and provided with an elongated key with a recess, a sleeve on the standard provided with a slot for receiving the key of said standard, said sleeve being provided with projections and adapted to be moved longitudinally of the standard for engaging its projections with the projections of the hub, and a detent member adapted to be moved into the recess of the key of the standard for maintaining the projections of the sleeve in engagement with the projections of the hub.

3. In combination with the hub of a normally rotatable steering wheel, said hub being provided with projections, a non-rotatable standard disposed in line with the longitudinal axis of the hub and provided with a key having a recess and a second recess, a sleeve on the standard provided with a slot for receiving the key of the standard, said sleeve being provided with projections and adapted to be reciprocated longitudinally of the standard for alternate engagements and disengagements of its projections with the projections of the hub, a detent member carried by the sleeve and adapted to be moved into the second recess of said key member after said sleeve has performed one of its longitudinal movements for maintaining the projections of the sleeve in engagement with the projections of the hub, and adapted to be moved into the first named recess of the key of said standard after the sleeve has performed a reverse longitudinal movement for maintaining the projections of the sleeve in disengaged relation with the projections of the hub.

In testimony whereof, I have affixed my signature in presence of two witnesses.

ARTHUR H. STURGES.

Witnesses:
  HIRAM A. STURGES,
  A. F. CLARK.